(12) United States Patent
Tan et al.

(10) Patent No.: US 7,684,029 B2
(45) Date of Patent: Mar. 23, 2010

(54) METHOD AND APPARATUS FOR IDENTIFYING A SENSED LIGHT ENVIRONMENT

(75) Inventors: Wee-Sin Tan, Singapore (SG); Masatoshi Yamai, Tokyo (JP); Deng-Peng Chen, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 631 days.

(21) Appl. No.: 10/977,958

(22) Filed: Oct. 29, 2004

(65) Prior Publication Data
US 2006/0092407 A1 May 4, 2006

(51) Int. Cl.
*G01J 1/42* (2006.01)
*G09G 5/00* (2006.01)

(52) U.S. Cl. .................. 356/221; 250/339.01; 345/175; 356/213

(58) Field of Classification Search ......... 356/213–232, 356/315–320; 250/339.01, 339.02, 339.05, 250/339.07, 339.11, 339.12, 339.15; 430/7, 430/578; 345/172, 175
See application file for complete search history.

(56) References Cited

U.S. PATENT DOCUMENTS

| | | | |
|---|---|---|---|
| 4,769,531 A * | 9/1988 | Malek | 250/206.2 |
| 4,983,853 A | 1/1991 | Davall et al. | |
| 5,281,816 A * | 1/1994 | Jacobson et al. | 250/339.05 |
| 5,332,904 A * | 7/1994 | Cannon | 250/372 |
| 5,625,342 A | 4/1997 | Hall et al. | |
| 5,804,825 A * | 9/1998 | Schuler | 250/339.15 |
| 5,886,783 A | 3/1999 | Shapanus et al. | |
| 6,009,340 A * | 12/1999 | Hsia | 600/407 |
| 6,046,452 A | 4/2000 | Castleman et al. | |
| 6,121,616 A * | 9/2000 | Trigg | 250/339.07 |
| 6,163,309 A * | 12/2000 | Weinert | 345/7 |
| 6,166,496 A * | 12/2000 | Lys et al. | 315/316 |
| 6,239,435 B1 | 5/2001 | Castleman | |
| 6,518,574 B1 | 2/2003 | Castleman | |
| 6,992,580 B2 * | 1/2006 | Kotzin et al. | 340/539.11 |
| 7,514,899 B2 * | 4/2009 | Deng-Peng | 320/101 |
| 2003/0123056 A1 * | 7/2003 | Barnes et al. | 356/300 |
| 2004/0047518 A1 | 3/2004 | Tiana | |

FOREIGN PATENT DOCUMENTS

| | | |
|---|---|---|
| DE | 3941391 | 6/1991 |
| DE | 3941391 A1 | 6/1991 |
| GB | 2358919 | 8/2001 |
| GB | 2358919 A | 8/2001 |
| JP | 10-213432 | 1/1997 |
| JP | 10213432 A | 8/1998 |

* cited by examiner

*Primary Examiner*—Sang Nguyen

(57) ABSTRACT

In one embodiment, a sensed dataset includes data produced by a plurality of light sensors that have been exposed to a light environment. The data of the sensed dataset corresponds to different ranges of light, and at least a portion of one of the ranges of light is outside the visible (VIS) light spectrum. The sensed dataset is compared to a plurality of known datasets representative of known light environments, and at least one known dataset that is similar to the sensed dataset is identified. In response thereto, an indication of the sensed light environment is provided. Apparatus for implementing this and related methods is also disclosed. In some embodiments, the light sensors are ultraviolet, visible and infrared sensors, and the indication of the sensed light environment is used to control the color of data acquired by an image sensor, or the color of a display backlight.

16 Claims, 3 Drawing Sheets

METHOD AND APPARATUS FOR IDENTIFYING A SENSED LIGHT ENVIRONMENT

BACKGROUND

Portable devices such as cameras, mobile phones and personal digital assistants (PDAs) can be operated in a variety of light environments (e.g., in sunlight, incandescent light, fluorescent light, or halogen light). Typically, a device is optimized for one particular light environment, and in other environments, the device may not operate optimally. For example, in some light environments, a device's display may be difficult to read, or the color of images acquired by the device's image sensor (e.g., in the case of a camera) may be off-color.

Some devices are provided with an ambient light sensor to sense the intensity of light in a device's environment. These devices may then increase or decrease the brightness of the device's display, or the gain of the device's image sensor. However, two light environments may have the same intensity, but have very different effects on the device's operation. For example, one light environment may tend to wash-out a display's colors, whereas another light environment may accentuate a display's (or acquired image's) blue hues.

SUMMARY OF THE INVENTION

In one embodiment, a method for identifying a sensed light environment comprises receiving a sensed dataset comprised of data produced by a plurality of light sensors that have been exposed to a light environment. The data of the sensed dataset corresponds to different ranges of sensed light, and at least a portion of one of the ranges of light is outside the visible (VIS) light spectrum. The sensed dataset is compared to a plurality of known datasets representative of known light environments, and at least one known dataset that is similar to the sensed dataset is identified. In response to this identification, an indication of the sensed light environment is provided.

In another embodiment, apparatus comprises a plurality of light sensors, a memory and a controller. Each of the plurality of light sensors is sensitive to a different range of light, and at least a portion of one of the ranges of light is outside the visible (VIS) light spectrum. The light sensors are configured to produce data defining a sensed dataset in response to being exposed to a light environment. The memory is configured to store a plurality of known datasets representative of known light environments. The controller is configured to search the memory to identify at least one known dataset similar to the sensed dataset and, in response to the identified known dataset(s), provide an output indicative of the sensed light environment.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
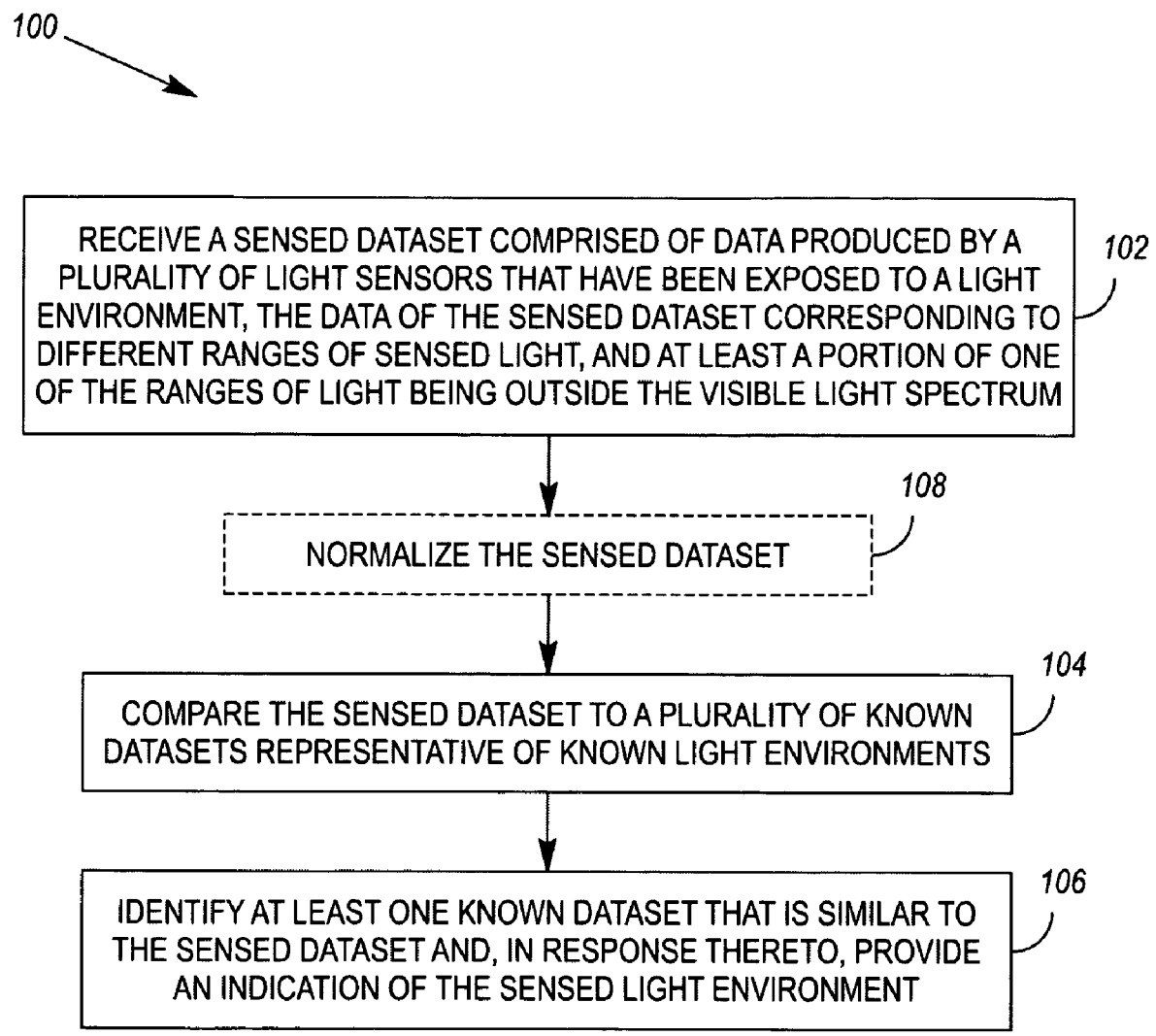
FIG. 1 illustrates an exemplary method for identifying a sensed light environment.

FIG. 1 illustrates an exemplary method 100 for identifying a sensed light environment. In accordance with the method 100, a sensed dataset is received 102. The sensed dataset is comprised of data produced by a plurality of light sensors that have been exposed to a particular light environment. By way of example, the light environment may be one containing sunlight, incandescent light, fluorescent light, or halogen light. As a result of the different sensors being sensitive to different ranges of light (i.e., different wavelengths of light), the data of the sensed dataset corresponds to different ranges of sensed light. The sensors are chosen such that at least a portion of one of the ranges of light is outside the visible (VIS) light spectrum. In one embodiment, the sensors comprise ultraviolet (UV), VIS and infrared (IR) sensors that respectively produce data corresponding to UV, VIS and IR ranges of light.

After receiving the sensed dataset, the method 100 continues by comparing 104 the sensed dataset to a plurality of known datasets. Each of the known datasets is representative of a known light environment (e.g., sunlight, incandescent light, etc.). The method 100 then identifies 106 at least one known dataset that is similar to the sensed dataset and, in response thereto, provides an indication of the sensed light environment.

Figure 2A:
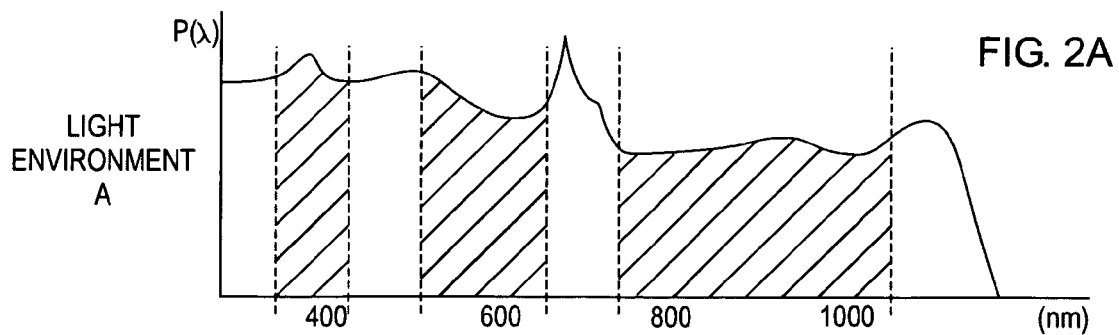
FIGS. 2A, 2B & 2C illustrate the different spectrums of light contained in exemplary light environments A, B and C.
Figure 2B:
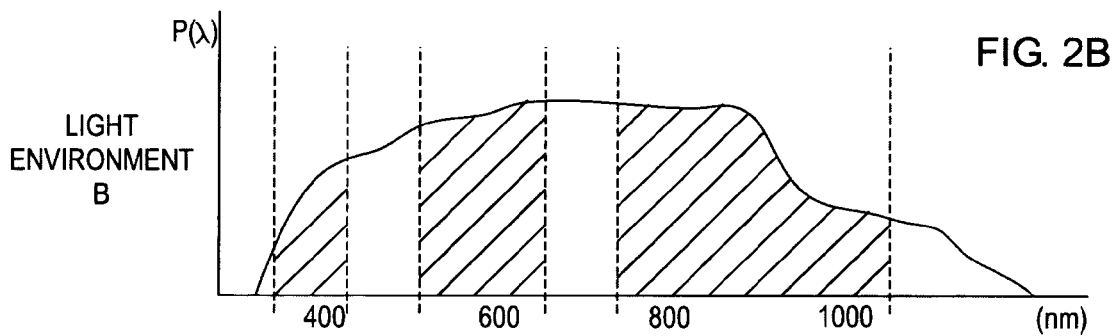
Figure 2C:
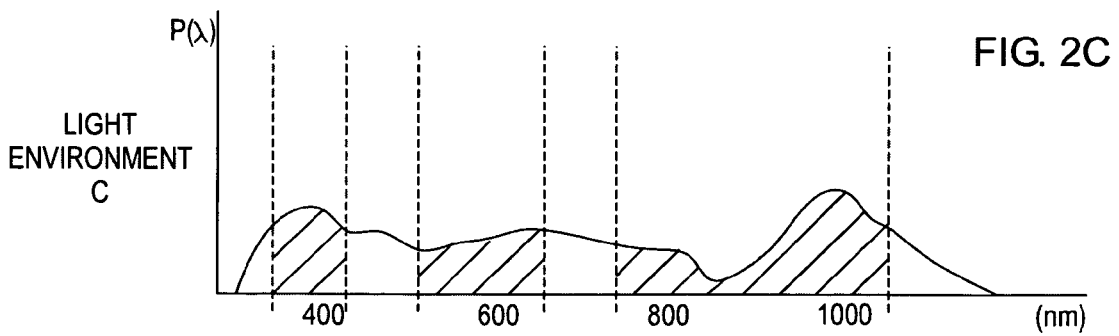
Figure 2D:
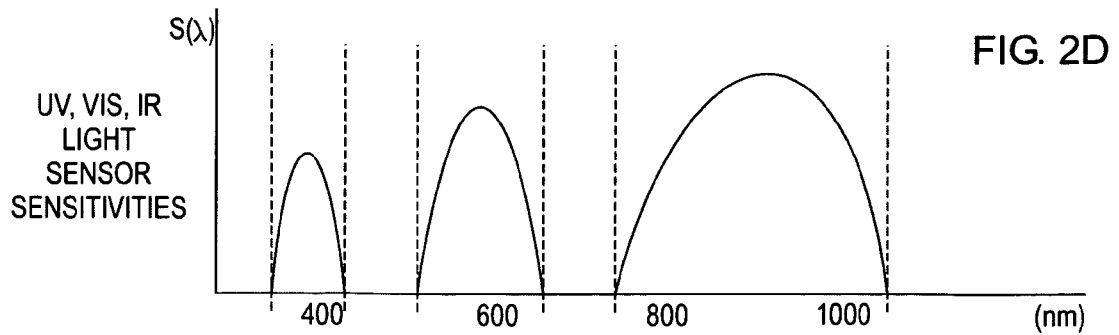
FIG. 2D illustrates the light sensitivities of three exemplary light sensors.

The data in the sensed and known datasets may take various forms. In one embodiment, the datasets comprise amplitudes of the various components of light sensed by a plurality of sensors. For example, FIGS. 2A, 2B and 2C illustrate the different spectrums of light contained in exemplary light environments A, B and C. The amplitude of light received by a light sensor when exposed to one of these light environments is defined by the following integral:

$$A_x = \int_\lambda P_x(\lambda) S_x(\lambda) d\lambda \qquad \text{(Equation 1)}$$

where $A_x$ represents the amplitude of a light component "x" (or the amplitude of a signal produced by the sensor "x"), $P_x$ represents the spectrum of light that passes to the sensor "x", $S_x$ represents the sensitivity of the light sensor "x", and $\lambda$ represents the wavelengths of light over which the amplitude of light is integrated. By way of example, the light sensitivities of three exemplary light sensors are shown in FIG. 2D. By way of example, the three light sensors to which the sensitivities shown in FIG. 2D correspond are UV, VIS and IR sensors.

By means of Equation 1, or by means of exposing a plurality of light sensors to various light environments, a dataset of values $A_x$ can be calculated or measured for each of a plurality of light components in each of a number of light environments. As demonstrated by the exemplary light environments A-C shown in FIGS. 2A-2C, different light environments typically comprise different ratios of light components (e.g., different ratios of UV, VIS and IR light). When a sensed dataset ($A_{UV\_S}$, $A_{VIS\_S}$, $A_{IR\_S}$) is received, it may then be compared to each of a plurality of "N" known datasets ($A_{UV\_K0}$, $A_{VIS\_K0}$, $A_{IR\_K0}$; $A_{UV\_K1}$, $A_{VIS\_K1}$, $A_{IR\_K1}$; ... $A_{UV\_KN}$, $A_{VIS\_KN}$, $A_{IR\_KN}$) to identify one or more known datasets that are similar to the sensed dataset.

In one embodiment of the method 100, the known datasets are normalized, and the method 100 further comprises normalizing 108 the sensed dataset before comparing it to the known datasets.

In some cases, the indication of the sensed light environment may simply be a designator of the type of light environment identified. This designator may then be used in a variety of different applications, such as, to influence color compensation for data acquired by an image sensor, to influence the backlighting (color or intensity) of a display, or to provide an alert of an emergency condition (e.g., too much time spent in sunlight, or the possible presence of fire).

In other cases, the known datasets may be associated with control parameters. If the method 100 simply identifies a "most similar" known dataset, then the method 100 may output the control parameters associated with the identified dataset as its indication of the sensed light environment. Alternately, in the absence of a dataset "match", the method 100 may be configured to 1) identify two or more known datasets, each of which is similar to the sensed dataset in some way, 2) interpolate between the control parameters associated with the known datasets, and then 3) provide interpolated control parameters as the method's indication of a sensed light environment. For example, if the control parameters dictate a 10% increase in a backlight's blue hues in a first light environment, and a 5% increase in a backlight's blue hues in a second light environment, then a light environment falling between these two light environments might be associated with a 7.5% increase in the backlight's blue hues.

Any, and preferably all, of the operations performed by the method 100 may be carried out by machine executable instructions stored on a program storage device. As defined herein, a program storage device may take the form of any storage medium, including that of a removable or fixed storage device, or a programmed general-purpose or special-purpose computer.

Although the method 100 has various applications, it is especially suited to controlling one or more features of (or providing alerts via) a portable device such as a camera, mobile phone or personal digital assistant (PDA). However, the method 100 may also be used to control features of (or provide alerts via) a stationary device such as a desktop computer. Given that portable devices will often be used in different light environments, a portable device is often provided with an ambient light sensor (usually a visible (VIS) light sensor) for the purpose of adjusting the intensity of its display, as well as an IR transceiver for communicating with other devices. Some portable devices also comprise a UV sensor for detecting the UV radiation of the device's environment (and those that do not can be provided with such a sensor at a relatively low cost). If a device is already provided with these sensors, then a device need only be provided with additional circuitry, firmware and/or software to tap the outputs of these sensors for the purpose of implementing the method 100.

Figure 3:
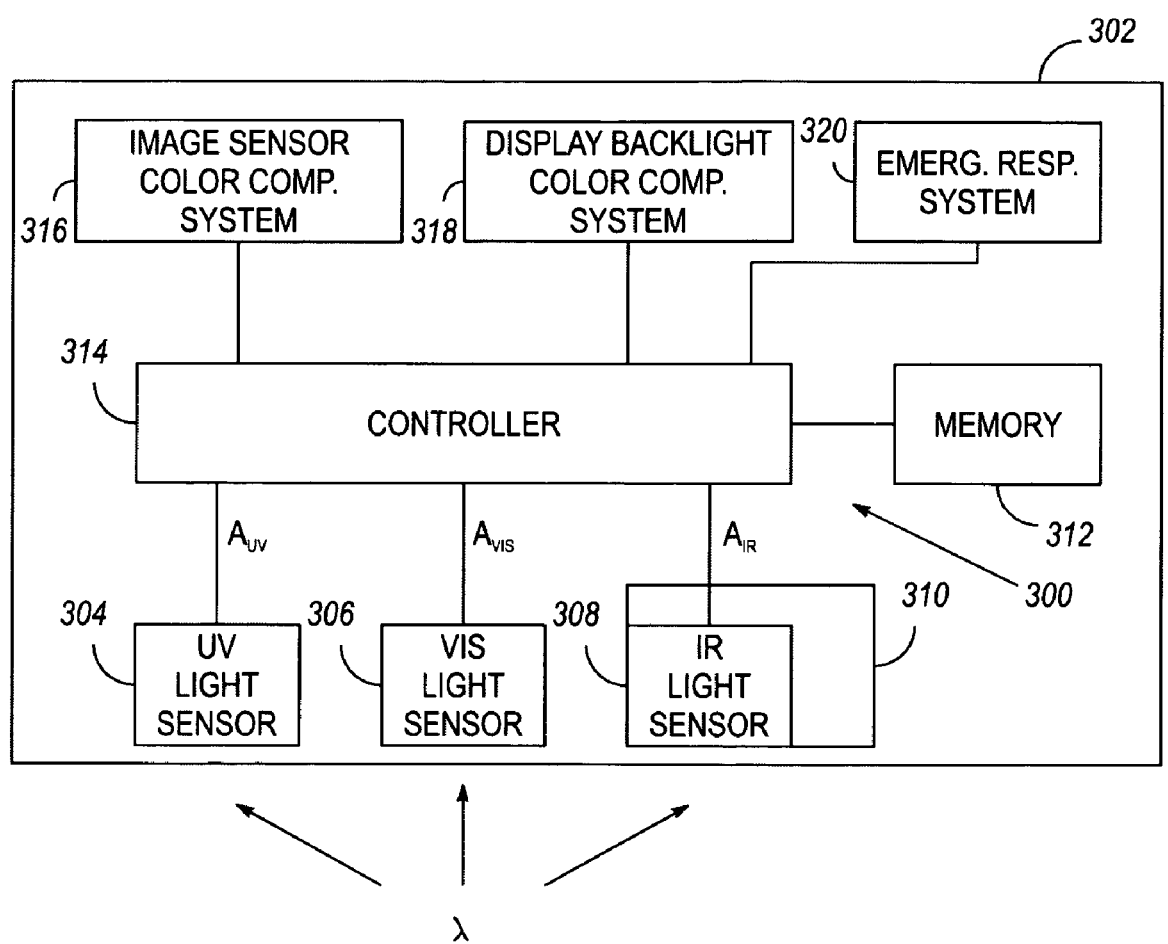
FIG. 3 illustrates exemplary apparatus for identifying a sensed light environment.

FIG. 3 illustrates exemplary apparatus 300 for identifying a sensed light environment. By way of example, the apparatus 300 is shown to be a component of a portable device 302. As previously discussed, the device 302 may be provided with (or may already comprise) a plurality of light sensors 304, 306, 308 such as a UV light sensor 304, a VIS light sensor 306, and an IR light sensor 308. In one embodiment, the IR sensor 308 is part of an IR transceiver 310. As shown, some or all of the light sensors 304-308 may be multi-purpose sensors and, in addition to providing the data needed to identify a sensed light environment, may perform other functions (e.g., the IR sensor 308 may also be used to receive IR data communications).

When the light sensors 304-308 of the device 302 are exposed to a particular light environment (e.g., because the device 302 is being used in the particular light environment), light incident upon the sensors 304-308 causes each of the sensors 304-308 to produce an electrical current or voltage signal, the magnitude of which is representative of the amplitude of light in a given light range. As shown in FIG. 3, UV sensor 304 may produce signal $A_{UV}$, VIS sensor 306 may produce signal $A_{VIS}$, and IR sensor 308 may produce signal $A_{IR}$. Often, these signals may be amplified, filtered and digitized. However, these sorts of pre-processing steps are known in the art and are beyond the scope of this description. As used herein, the term "data" can alternately represent both processed and unprocessed signals that are derived from a sensor 304-308. Together, the data produced by a plurality of light sensors 304-308 is referred to herein as a sensed dataset ($A_{UV}$, $A_{VIS}$, $A_{IR}$).

The device 302 further comprises a memory 312 for storing a plurality of known datasets, each of which represents a known light environment (e.g., sunlight, incandescent light, etc.). In one embodiment, each dataset may take the form of a set of amplitudes corresponding to the amplitude of ultraviolet light, visible light and infrared light that might be expected in a particular light environment. These amplitudes may be similarly programmed for all devices 302, or may be dynamically acquired by placing a particular device 302 in each of a number of different light environments. In some cases, the datasets may be normalized by, for example, fixing the value of $A_{VIS}$ in each dataset to 1.0 and multiplying the other components by the multiplier required to fix $A_{VIS}$ to 1.0, to create datasets comprising ratios of UV, VIS and IR light for known light environments.

The device 302 further comprises a controller 314. If the known datasets stored in the memory 312 are normalized, the controller 314 may also normalize the values of a sensed dataset. The controller 314 is also configured to 1) search the memory 312 to identify at least one known dataset that is similar to a sensed dataset, and 2) in response to the identified dataset(s), provide an output that is indicative of the sensed light environment.

In some cases, the controller's output may simply be a designator of the type of light environment identified. This designator may then be supplied to a variety of hard-wired, firmware or software systems, such as an image sensor color compensation system 316, a display backlight color compensation system 318, or an emergency response system 320.

In other cases, the known datasets stored in memory 312 may be associated with control parameters. If the controller 314 simply identifies a "most similar" known dataset, then the controller 314 may output the control parameters associated with its identified dataset as its indication of the sensed light environment. Alternately, in the absence of a dataset "match", the controller 314 may be configured to 1) identify two or more known datasets, each of which is similar to the sensed dataset in some way, 2) interpolate between the control parameters associated with the known datasets, and then 3) provide interpolated control parameters as the controller's output.

If the known datasets are associated with control parameters, the control parameters may variously comprise: color compensation parameters for data acquired by an image sensor; color compensation parameters for a display backlight; emergency alert notifications; and/or other control parameters.

Although exemplary embodiments of the methods and apparatus disclosed herein have been described in the context of systems comprising three light sensors, the methods and apparatus can be implemented using other numbers of sensors. At a minimum, the methods and apparatus require two sensors, such as UV and VIS sensors, or VIS and IR sensors. However, the use of only two sensors may make it more difficult to distinguish different light environments, or may limit the types of light environments that can be distinguished.

What is claimed is:

1. Apparatus, comprising:
 a plurality of light sensors, each sensitive to a different range of light, and at least a portion of one of the ranges of light being outside the visible (VIS) light spectrum, the light sensors being configured to produce data defining a sensed dataset in response to being exposed to a light environment;
 a memory to store a plurality of known datasets representative of known light environments; and
 a controller to i) search the memory to identify at least one known dataset similar to the sensed dataset, and ii) in response to the identified known dataset(s), provide an output indicative of the sensed light environment.

2. The apparatus of claim 1, wherein the plurality of light sensors comprises an ultraviolet (UV) sensor, a VIS sensor, and an infrared (IR) sensor.

3. The apparatus of claim 2, wherein the IR sensor comprises a component of an IR transceiver.

4. The apparatus of claim 1, wherein the known datasets are normalized, and wherein the controller is further configured to normalize the sensed dataset before searching the memory.

5. The apparatus of claim 1, wherein the known datasets are associated with control parameters, and wherein the controller output indicative of the sensed light environment comprises the control parameters associated with a single, identified, known dataset.

6. The apparatus of claim 1, wherein the known datasets are associated with control parameters, and wherein, when the controller identifies at least two known datasets similar to the sensed dataset, the controller output indicative of the sensed light environment is based on an interpolation between the control parameters associated with the identified known datasets.

7. The apparatus of claim 1, further comprising an image sensor color compensation system, wherein the output indicative of the sensed light environment is provided to the image sensor color compensation system.

8. The apparatus of claim 1, further comprising a display backlight color compensation system, wherein the output indicative of the sensed light environment is provided to the display backlight color compensation system.

9. The apparatus of claim 8, further comprising an image sensor color compensation system, wherein the output indicative of the sensed light environment is provided to the image sensor color compensation system.

10. The apparatus of claim 1, wherein at least one of the known datasets corresponds to a light environment indicative of an emergency condition.

11. A method for identifying a sensed light environment, comprising:
 receiving a sensed dataset comprised of data produced by a plurality of light sensors that have been exposed to a light environment, the data of the sensed dataset corresponding to different ranges of sensed light, and at least a portion of one of the ranges of light being outside the visible (VIS) light spectrum;
 comparing the sensed dataset to a plurality of known datasets representative of known light environments;
 identifying at least one known dataset that is similar to the sensed dataset and, in response thereto, providing an indication of the sensed light environment; and
 using said indication of the sensed light environment to influence backlighting of a display.

12. The method of claim 11, wherein the data of the sensed dataset corresponds to ultraviolet (UV), visible, and infrared (IR) ranges of light.

13. The method of claim 11, wherein the known datasets are normalized, the method further comprising normalizing the sensed dataset before comparing it to the known datasets.

14. The method of claim 11, wherein the known datasets are associated with control parameters, and wherein, when the method identifies at least two known datasets similar to the sensed dataset, the method further comprises:
 interpolating between the control parameters associated with the identified known datasets; and
 providing interpolated control parameters as said indication of the sensed light environment.

15. The method of claim 11, further comprising, using said indication of the sensed light environment to provide an alert of an emergency condition.

16. A program storage device storing machine executable instructions for performing operations comprising:
 receiving a sensed dataset comprised of data produced by a plurality of light sensors that have been exposed to a light environment, the data of the sensed dataset corresponding to different ranges of sensed light, and at least a portion of one of the ranges of light being outside the visible (VIS) light spectrum;
 comparing the sensed dataset to a plurality of known datasets representative of known light environments; and
 identifying at least one known dataset that is similar to the sensed dataset, and in response thereto, controlling a feature of a portable device.

* * * * *